US007558842B2

(12) United States Patent
Clark

(10) Patent No.: US 7,558,842 B2
(45) Date of Patent: Jul. 7, 2009

(54) LARGE FILE TRANSFER IN A DESIGN COLLABORATION ENVIRONMENT

(75) Inventor: Gregory Scott Clark, Hillsborough, CA (US)

(73) Assignee: E2open, Inc., Redwood City, CA (US)

( * ) Notice: Subject to any disclaimer, the term of this patent is extended or adjusted under 35 U.S.C. 154(b) by 392 days.

(21) Appl. No.: 10/688,066

(22) Filed: Oct. 17, 2003

(65) Prior Publication Data

US 2005/0086387 A1     Apr. 21, 2005

(51) Int. Cl.
G06F 15/16 (2006.01)
G06F 9/00 (2006.01)
G06F 17/00 (2006.01)

(52) U.S. Cl. .......................... 709/219; 709/227; 726/11

(58) Field of Classification Search ......... 709/201–203, 709/225, 219, 227; 707/10; 713/151–152; 726/11
See application file for complete search history.

(56) References Cited

U.S. PATENT DOCUMENTS

| | | | |
|---|---|---|---|
| 5,715,402 A | | 2/1998 | Popolo |
| 5,778,174 A | * | 7/1998 | Cain ............................ 726/11 |
| 5,826,029 A | * | 10/1998 | Gore et al. .................. 709/227 |
| 5,828,893 A | * | 10/1998 | Wied et al. .................. 709/229 |
| 5,838,916 A | * | 11/1998 | Domenikos et al. ......... 709/219 |
| 5,944,823 A | * | 8/1999 | Jade et al. ...................... 726/15 |
| 6,021,491 A | * | 2/2000 | Renaud ....................... 713/179 |
| 6,088,796 A | * | 7/2000 | Cianfrocca et al. .......... 713/152 |
| 6,104,716 A | * | 8/2000 | Crichton et al. ............. 370/401 |
| 6,141,759 A | * | 10/2000 | Braddy ........................ 726/14 |
| 6,154,778 A | * | 11/2000 | Koistinen et al. ........... 709/228 |
| 6,202,081 B1 | * | 3/2001 | Naudus ....................... 709/200 |
| 6,212,640 B1 | * | 4/2001 | Abdelnur et al. ............... 726/2 |
| 6,233,688 B1 | * | 5/2001 | Montenegro ................. 726/11 |
| 6,289,461 B1 | * | 9/2001 | Dixon ......................... 726/11 |
| 6,324,574 B1 | * | 11/2001 | Gong .......................... 709/218 |
| 6,377,974 B1 | * | 4/2002 | Feigenbaum ................ 709/203 |
| 6,553,405 B1 | * | 4/2003 | Desrochers ................. 709/203 |

(Continued)

FOREIGN PATENT DOCUMENTS

WO   WO 2004/036348 A2    4/2004

(Continued)

OTHER PUBLICATIONS

Wilson, Brendon J. "Technical Note: Java Applet Signing Guide", Version 1.1, Apr. 7, 2000, 13 pages.*

(Continued)

*Primary Examiner*—George C Neurauter, Jr.
(74) *Attorney, Agent, or Firm*—Swernofsky Law Group PC

(57) ABSTRACT

Systems and methods for use in a B2B communication or integration environment, operating using a web browser to access systems protected by an enterprise network firewall, to transfer files in a manner that is reliable, restartable, and secure. After assuring the transfer is allowed, a web browser sends a signed applet to a file transfer client, which makes an out-of-band connection to a file transfer server. The file transfer client and file transfer server interact using a bi-directional protocol suited to file transfer operations. The techniques are applicable to transferring relatively large files, for example in excess of 1 Gigabyte, and relatively smaller files in network environments that are relatively less reliable.

32 Claims, 9 Drawing Sheets

U.S. PATENT DOCUMENTS

| | | |
|---|---|---|
| 6,633,985 B2 * | 10/2003 | Drell .......................... 726/11 |
| 6,910,128 B1 * | 6/2005 | Skibbie et al. ............... 713/170 |
| 2002/0046125 A1 | 4/2002 | Speicher et al. |
| 2002/0188513 A1 | 12/2002 | Gil et al. |
| 2003/0033517 A1 * | 2/2003 | Rutherglen et al. ......... 713/153 |
| 2003/0172300 A1 * | 9/2003 | Parry .......................... 713/201 |
| 2004/0034793 A1 * | 2/2004 | Yuan .......................... 713/200 |
| 2004/0078316 A1 | 4/2004 | Clark et al. |
| 2005/0086387 A1 | 4/2005 | Clark |

FOREIGN PATENT DOCUMENTS

| | | |
|---|---|---|
| WO | WO 2005/038602 A2 | 4/2005 |

OTHER PUBLICATIONS

Clip2.com. "The Gnutella Protocol Specification v0.4", document revision 1.0, publicly posted Apr. 9, 2003, <http://www9.limewire.com/developer/gnutella_protocol_0.4.pdf>, 11 pages.*

* cited by examiner

LARGE FILE TRANSFER IN A DESIGN COLLABORATION ENVIRONMENT

BACKGROUND OF THE INVENTION

1. Field of the Invention

The invention relates to large file transfer from behind a secure firewall, such as for example in a B2B communication or integration environment.

2. Description of the Related Art

In known systems in which B2B communication or integration occurs, each party often couples its B2B systems from behind an enterprise network firewall. The firewall is typically configured to disallow any communication across the firewall, other than specific selected communication protocols. Typically, these specific selected communication protocols include only email and web browsing.

One problem in the known art is that neither email nor web browsing allow for convenient transfer of large amounts of data, such as for example large files. Email communication is typically limited by a pre-selected maximum amount of disk space allotted to cached email, by a pre-selected maximum amount of disk space allotted to received email, and by a pre-selected maximum size of an email message, whichever of these is less, for the entire path the email must travel from source to destination. Moreover, email involves a transfer of a single large file, so that if an email message is not delivered in its entirety, retry does not involve being able to restart the message from some delivery midpoint. Web browsing is limited by using a request/response model of communication, not involving serial delivery of multiple chunks of information. Thus, like email, if a web message (such as for example a POST command) is not delivered in its entirety, retry does not involve being able to restart the message from some delivery midpoint.

Accordingly, it would be advantageous to provide an improved technique for transferring files, such as for example a technique using a web browser connection from behind a secure firewall, in a manner that is reliable, restartable, and secure. In one embodiment, the files might be very large, such as for example in excess of 1 Gigabyte.

SUMMARY OF THE INVENTION

The invention provides systems and methods that might be used in a B2B communication or integration environment, operating using a web browser to access systems protected by an enterprise network firewall, to transfer files in a manner that is reliable, restartable, and secure. After assuring the transfer is allowed, a web browser sends a signed applet to a file transfer manager, which makes an out-of-band connection to a file transfer server. The browser and server interact to transfer the file.

The techniques provided by the invention are applicable to transferring relatively large files. For example, in one embodiment, the files might be very large, such as for example in excess of 1 Gigabyte. The techniques provided by the invention are also applicable to transferring relatively smaller files in network environments that are relatively less reliable. The techniques provided by the invention might be used in combination or conjunction with other techniques for ensuring reliable, restartable, and secure transfer. For example, not intended to be limiting in any way, large files might be encrypted at the source and decrypted at the destination, or might be digitally signed or associated with a hash code at the source, and signature or hash code checked with at the destination.

One embodiment of an aspect of the invention is a method of transferring a file to or from a server past a firewall. This method is generally from the perspective of a client or browser requesting the transfer, although the method is not limited to this setting.

The method includes the step of accessing a web site behind the firewall. The web site has a web page including an applet, and the web site is associated with the server. The method also includes the steps of receiving the web page and the applet from the web site, sending the applet to an application at a file transfer gateway, and transferring the file between the file transfer gateway and the server through the firewall.

Preferably, the web site is at a collaboration manager separate from the server. Thus, in this case, the transfer of the file is "out-of-band" of the initial communication with the web site.

The applet can be signed responsive to authorization of a user accessing the web site. This step helps ensure security of the file transfer.

Accessing the web site and receiving the web page and the applet preferably are performed using a web browser. The browser, along with the file transfer gateway, can be implemented on a client.

Preferably, the application at the file transfer gateway is a file transfer service implemented on a client or edgebox. In this case, transferring the file between the file transfer gateway and the server can be performed over a virtual channel between the file transfer service at the file transfer gateway and a file transfer adapter at the server.

The file preferably is transferred in chunks. Thus, if the transfer is interrupted, chunks that have already been transferred may not have to be re-sent. In the preferred embodiment of this aspect of the invention, the chunks are transferred using a basic hypertext transport mechanism. This facilitates ease of implementation.

An embodiment of another aspect of the invention is also a method of transferring a file to or from a server past a firewall. This method is generally from the perspective of a collaboration manager and server that implement a requested file transfer, although the method is not limited to this setting.

The method includes the step of authenticating access by a requestor to a web site behind the firewall, with the web site having a web page including an applet, and the web site being associated with the server. The method also includes the steps of sending the web page and the applet to the requestor, receiving a request from the requestor to transfer the file to or from the requestor, and transferring the file between the file transfer gateway and the server through the firewall.

The requestor can be a browser or edgebox. Other embodiments are possible. Preferably, the applet is signed responsive to authorization of the requester, which can help ensure security of the transfer.

In the preferred embodiment, the web site is at a collaboration manager separate from the server. Thus, in this case, the transfer of the file is "out-of-band" of the initial communication with the web site.

Preferably, transferring the file between the file transfer gateway and the server is performed over a virtual channel between a file transfer service at the file transfer gateway and a file transfer adapter at the server.

The file preferably is transferred in chunks. Thus, if the transfer is interrupted, chunks that have already been transferred may not have to be re-sent. In the preferred embodiment of this aspect of the invention, the chunks are transferred using a basic hypertext transport mechanism. This facilitates ease of implementation.

The invention also is applicable for a "push" operation in which a file download is pushed from a server to a target. From the target's perspective, one embodiment of this aspect of the invention is a method that includes the steps of registering with the server behind the firewall, polling the server for files to be downloaded, and downloading the file from the server through the firewall over a virtual channel. From the server's perspective, another embodiment is a method that includes receiving a registration at the server behind the firewall, receiving polling of the server for files to be downloaded, and downloading the file from the server through the firewall over a virtual channel.

In both of these methods, the file preferably is transferred in chunks using a basic hypertext transport mechanism. As with the other embodiments summarized above, these two methods are not limited to the setting of a push operation.

In all of these embodiments, other operations can be performed on the file before or after it is transferred. For example encryption, decryption, application of a hash or digital signature, or some other operation can be performed on the file.

The invention also encompasses computers and systems that implement the foregoing methods, as well as other embodiments.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Figure 1:
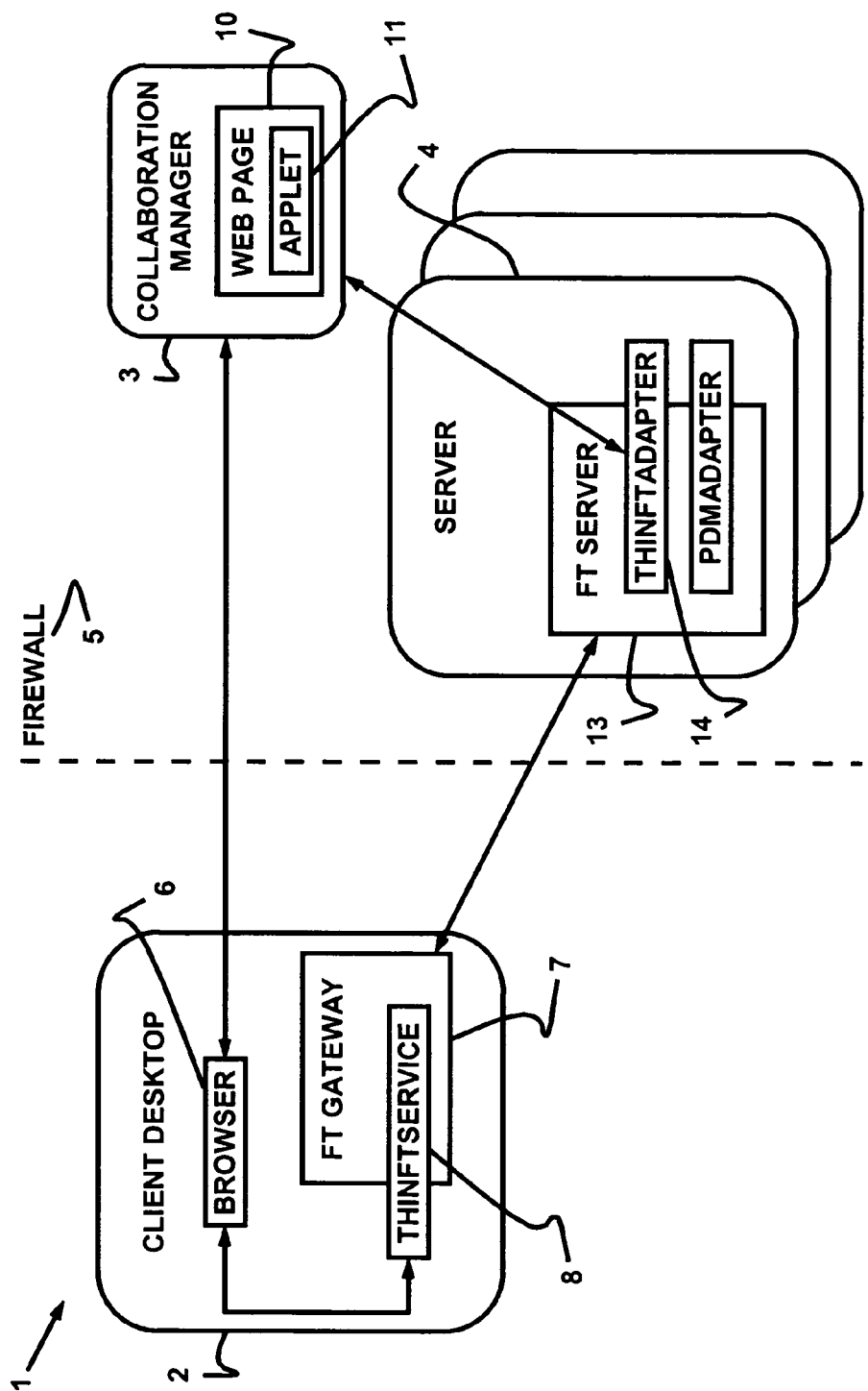
FIGS. 1 to 3 show block diagrams of systems including elements for performing file transfers from behind secure firewalls, such as for example in client-server or B2B communication and integration environments.

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The phrase "B2B communication or integration environment" describes a business-to-business environment in which businesses communicate as customer/provider or as collaborators.

The phrase "web browser" describes a program that interprets hypertext markup language (HTML) documents to generate text and images. Examples of browsers include, but are not limited to, Microsoft® Internet Explorer and Netscape® Navigator.

The phrase "enterprise network" describes a computer network for a large business enterprise.

The phrase "edgebox" describes a computer or system in an enterprise network that communicates with computers or systems outside the network.

The phrase "firewall" describes a barrier intended to prevent unauthorized access to one or more computers or networks. A firewall can be implemented in hardware, software, or both hardware and software. The protected computer(s) or network(s) are said to be "behind" the firewall.

The phrases "client" and "server" refer to a relationship between two devices, particularly to their relationship as client and server, not necessarily to any particular physical devices. For example, but without limitation, a particular client device in a first relationship with a first server device, can serve as a server device in a second relationship with a second client device. In a preferred embodiment, there are generally a relatively small number of server devices servicing a relatively larger number of client devices. These terms can also refer to devices taking on the role of client or server in a client-server relationship (such as an HTTP web client and web server). There is no particular requirement that any client devices or server devices must be individual physical devices. They can each be a single device, a set of devices, a portion of a device, or some combination thereof. For example, and without limitation, the client device and the server device in a client-server relationship can be actually be the same physical device, with a first set of software elements serving to perform client functions and a second set of software elements serving to perform server functions.

The phrase "transfer files" or "file transfer" describes sending one or more files from one computer or system to another computer or system.

The phrase "upload" describes transferring a file from a computer or system that requests the transfer to another computer or system. In a client-server environment, the transfer of a file from a client to a server is an "upload."

The phrase "download" describes transferring a file to a computer or system that requests the transfer from another computer or system. In a client-server environment, the transfer of a file to client from a server is a "download."

The phrase "push" describes a download that is initiated by the computer or system from which the file is transferred. In a client-server environment, a "push" occurs in response to a client requesting or registering to receive pushed downloads from a server, and the server subsequently initiating a download of a file to the client.

The phrase "out-of-band connection" describes a connection that appears to be between a first device and a second device using a link, channel, or band, but is actually to or from another device using a different channel or band.

The phrase "bi-directional protocol" describes a communication protocol that facilitates bi-directional communication, for example by including request and response messages.

The scope and spirit of the invention is not limited to any of these definitions, or to specific examples mentioned therein, but is intended to include the most general concepts embodied by these and other terms.

Overview

The invention provides systems and methods that might be used in a B2B communication or integration environment, operating using a web browser to access systems protected by an enterprise network firewall, to transfer files in a manner that is reliable, restartable, and secure. After assuring the transfer is allowed, a web browser sends a signed applet to a file transfer manager, which makes an out-of-band connection to a file transfer server. The browser and server interact to transfer the file. The systems and methods can be used in other environments as well.

The techniques provided by the invention are applicable to transferring relatively large files. For example, in one embodiment, the files might be very large, such as for example in excess of 1 Gigabyte. The techniques provided by the invention are also applicable to transferring relatively smaller files in network environments that are relatively less reliable. The techniques provided by the invention might be used in combination or conjunction with other techniques for ensuring reliable, restartable, and secure transfer. For example, not intended to be limiting in any way, large files might be encrypted at the source and decrypted at the destination, or might be digitally signed or associated with a hash code at the source, and signature or hash code checked with at the destination.

System Elements

Figure 2:
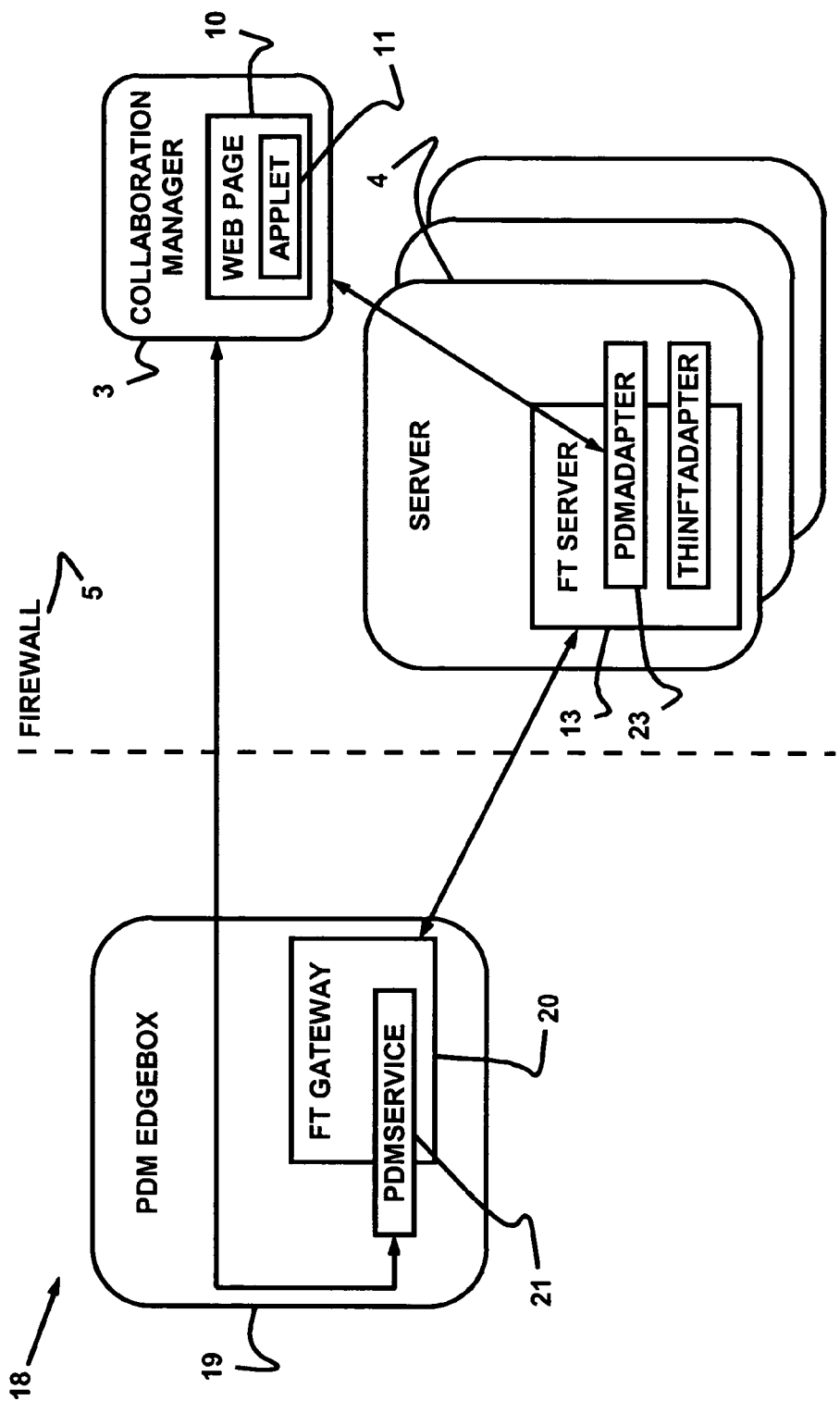
Figure 3:
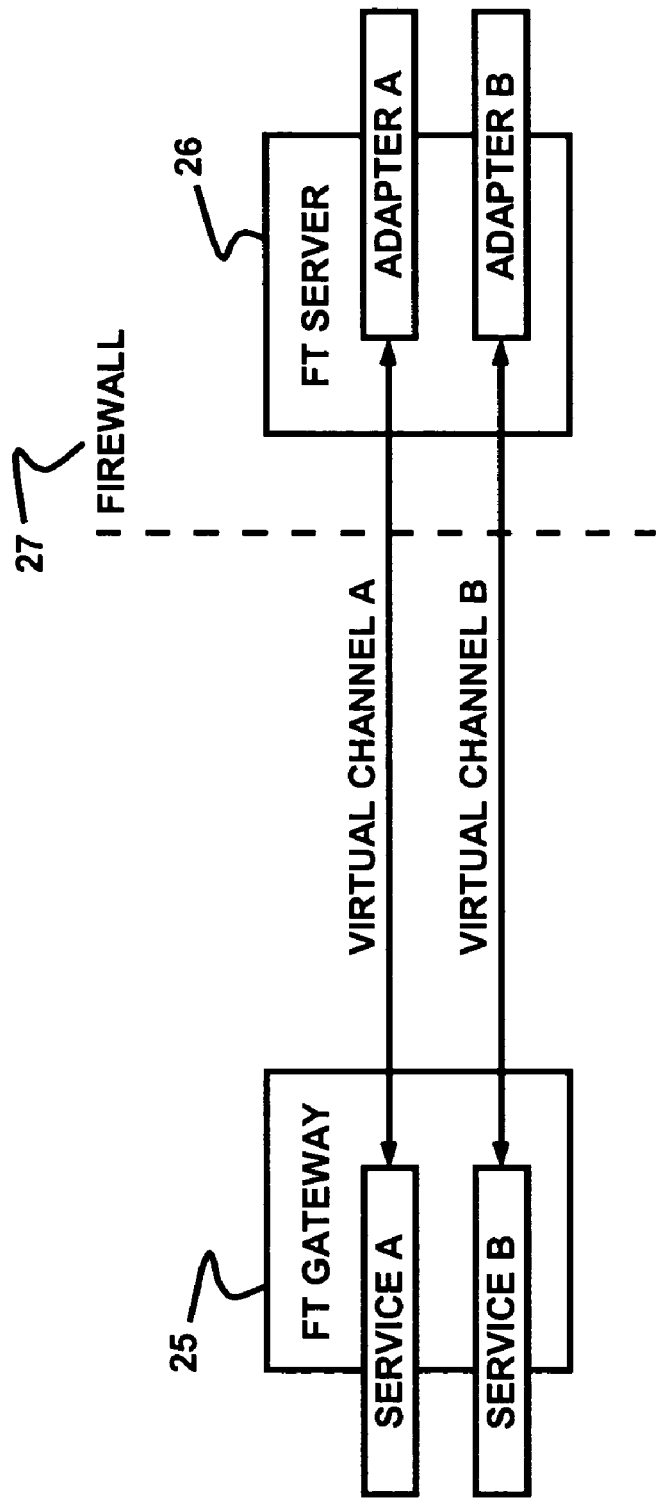

FIGS. 1 to 3 show block diagrams of systems including elements for performing file transfers from behind secure firewalls, such as for example in client-server or B2B communication and integration environments.

These systems might be used in a B2B communication or integration environment. In one embodiment, the systems communicate across an enterprise network firewall to transfer files in a manner that is reliable, restartable, and secure.

FIG. 1 illustrates an implementation of the invention that is particularly suited to be used with a so-called "thin client" or desktop system, although it can be adapted to other systems. System 1 in FIG. 1 includes client desktop 2, collaboration manager 3 (also called a file transfer manager), and server 4. Firewall 5 separates client desktop 2 from collaboration manager 3 and server 4.

Client desktop 2 preferably is running on some type of computer system. Browser 6 preferably is web browser, for example Microsoft® Internet Explorer or Netscape® Navigator. Other browsers can be used.

Also running on client desktop 2 is file transfer gateway 7. This file transfer gateway implements the client side of the file transfer technique of the invention. In the preferred embodiment, the file transfer gateway can include different services for different file transfer environments. Because FIG. 1 is for a "thin client" environment, file transfer gateway 7 is shown with thin file transfer service 8. Other services can be present.

Collaboration manager 3 preferably is a web site that includes web page 10 and applet 11 that are used during the file transfer operation.

Server 4 can be one of plural servers, as shown, or it can be the only server. In FIG. 1, file transfer server 13 is running on server 4. File transfer server 13 preferably can include different adapters for different file transfer environments. FIG. 1 shows thin file transfer adapter 14. Other adapters can be present.

In operation, browser 6 accesses a web site at collaboration manager 3 behind firewall 5. Collaboration manager 3 authenticates a requestor, which is the entity requesting the file transfer operation. In this case, the browser or a user at the browser is the requestor. Authentication preferably includes verifying authorization of the requestor to request a file a transfer. If authentication is successful, collaboration manager 3 sends web page 10 and applet 11 to the requestor.

Alternatively, some or all of the web page is sent before authentication. The web page is used by browser 6 for log-in, which is authenticated, and to specify details about the file transfer operation. Then, collaboration manager 3 sends applet 11 to browser 6.

In any event, applet 11 preferably is signed by collaboration manager 3 responsive the authentication of the requestor.

Server 4 is informed of the details of the file transfer operation by collaboration manager 3. Preferably, collaboration manager 3 communicates with thin file transfer adapter 14 at server 4.

The communication between the collaboration manager and the server is "out-of-band" of the initial communication between the browser and the collaboration manager. Preferably, the browser (and any user at the browser) is not even aware of this out-of-band communication, although this does not need to be the case.

After browser 6 receives the web page 10 and applet 11 from the collaboration manager, browser 6 sends the applet to thin file transfer service 8 at file transfer gateway 7. The applet preferably includes information that permits the file transfer gateway to access server 4 in order to perform the file transfer operation.

The communication between the gateway at the client desktop and the server is "out-of-band" of the initial communication between the browser and the collaboration manager. Preferably, the browser (and any user at the browser) is not even aware that communication is with the server as opposed to with the collaboration manager, although this does not need to be the case.

The file transfer occurs between file transfer gateway 7 and file transfer server 13 through firewall 5. In order to set up the transfer, the gateway can send a message to the file transfer server that includes context information for the transfer. This context information preferably includes quality of service information and recommended file transfer parameters. In the preferred embodiment, the server can accept or alter the recommended parameters. Preferably, this context information is sent using simple object access protocol (SOAP).

The server preferably validates the authenticity of the file transfer operation. This validation can include adapter 14 checking with service 8 to verify that applet 11 was signed properly.

Once details of the transfer are negotiated and the transfer is validated, the file is transferred between the gateway and the file transfer server, preferably across a virtual channel established between service 8 and adapter 14. In the preferred embodiment, the file is transferred in chunks using the hypertext transfer protocol (HTTP). If the transfer is interrupted, the transfer can be resumed without re-sending already transferred chunks.

Other operations can be performed on the file before or after it is transferred. For example encryption, decryption, application of a hash or digital signature, or some other operation can be performed on the file.

FIG. 2 illustrates an implementation of the invention that is particularly suited to be used with an enterprise system such as a product data management (PDM) edgebox, although it can be adapted to other systems. System 18 in FIG. 2 includes PDM edgebox 19, collaboration manager 3 (also called a file transfer manager), and server 4. Firewall 5 separates edgebox 19 from collaboration manager 3 and server 4.

The collaboration manager and server in FIG. 2 are depicted as the same collaboration manager and server as in FIG. 1 to illustrate that these elements can operate in both contexts. Collaboration managers and servers that are limited to one or more contexts are also possible.

PDM edgebox 19 preferably is some type of computer system in an enterprise network. In FIG. 2, the edgebox does not have a browser. Alternatively, the edgebox could have a browser, in which case the system in FIG. 2 could operate identically to the system in FIG. 1.

File transfer gateway 20 is running on edgebox 19. This file transfer gateway can be the same or different from file transfer gateway 7 in FIG. 1. In the preferred embodiment, file transfer gateway 20 can include different services for different file transfer environments. Because FIG. 2 is for an enterprise environment, file transfer gateway 20 is shown with PDM service 21. Other services can be present.

Collaboration manager 3 preferably is a web site that includes web page 10 and applet 11 that are used during the file transfer operation. Different web pages and applet designed specifically for the enterprise context also can be used.

Server 4 can be one of plural servers, as shown, or it can be the only server. In FIG. 2, file transfer server 13 is running on server 4. A different file transfer server designed specifically for the enterprise context also can be used.

File transfer server 13 preferably can include different adapters for different file transfer environments. FIG. 2 shows PDM adapter 23. Other adapters can be present, for example thin file transfer adapter 14.

In operation, edgebox 19 accesses a web site at collaboration manager 3 behind firewall 5. Collaboration manager 3 authenticates a requester, which is the entity requesting the file transfer operation. In this case, the edgebox is the requestor. Authentication preferably includes verifying authorization of the requestor to request a file a transfer. If authentication is successful, collaboration manager 3 sends web page 10 and applet 11 to the requestor.

Alternatively, some or all of the web page is sent before authentication. The web page is used by edgebox 19 for log-in, which is authenticated, and to specify details about the file transfer operation. Then, collaboration manager 3 sends applet 11 to edgebox 19.

In any event, applet 11 preferably is signed by collaboration manager 3 responsive to the authentication of the requestor.

Server 4 is informed of the details of the file transfer operation by collaboration manager 3. Preferably, collaboration manager 3 communicates with PDM adapter 23 at server 4.

The communication between the collaboration manager and the server is "out-of-band" of the initial communication between the edgebox and the collaboration manager. Preferably, the edgebox is not even aware of this out-of-band communication, although this does not need to be the case.

After edgebox 19 receives the web page 10 and applet 11 from the collaboration manager, edgebox 19 sends the applet to PDM service 21 at file transfer gateway 20. The applet preferably includes information that permits the file transfer gateway to access server 4 in order to perform the file transfer operation.

The communication between the gateway at the edgebox and the server is "out-of-band" of the initial communication between the edgebox and the collaboration manager. Preferably, the edgebox is not even aware that communication is with the server as opposed to with the collaboration manager, although this does not need to be the case.

The file transfer occurs between file transfer gateway 20 and file transfer server 13 through firewall 5. In order to set up the transfer, the gateway can send a message to the file transfer server that includes context information for the transfer. This context information preferably includes quality of service information and recommended file transfer parameters. In the preferred embodiment, the server can accept or alter the recommended parameters. Preferably, this context information is sent using simple object access protocol (SOAP).

The server preferably validates the authenticity of the file transfer operation. This validation can include adapter 23 checking with service 21 to verify that applet 11 was signed properly.

Once details of the transfer are negotiated and the transfer is validated, the file is transferred between the gateway and the file transfer server, preferably across a virtual channel established between service 21 and adapter 23. In the preferred embodiment, the file is transferred in chunks using the hypertext transfer protocol (HTTP). If the transfer is interrupted, the transfer can be resumed without re-sending already transferred chunks.

Other operations can be performed on the file before or after it is transferred. For example encryption, decryption, application of a hash or digital signature, or some other operation can be performed on the file.

FIG. 3 illustrates details of virtual channels that can be established between a file transfer gateway and a file transfer server according to the invention. In FIG. 3, file transfer gateway 25 communicates with file transfer server 26 through firewall 27.

The file transfer gateway has one or more services that are used for this communication. File transfer gateway 25 is shown with two such services: service A and service B. Other services can be present.

The file transfer server has matching adapters for services that may attempt communication with the server. Thus, file transfer gateway 26 is shown with adapter A and adapter B that match service A and service B. Other adapters can be present, for example for communication with other gateways.

The services and adapters create virtual channels between the gateway and the server. Preferably, plural virtual channels can be used simultaneously. These channels use protocols that can pass through the firewall, for example HTTP and SOAP protocols. Other protocols can be used, for example e-mail protocols that the firewall allows through. In the preferred embodiment of invention, messages for set-up and control of file transfers and any transferred files are sent using these protocols.

Figure 4:
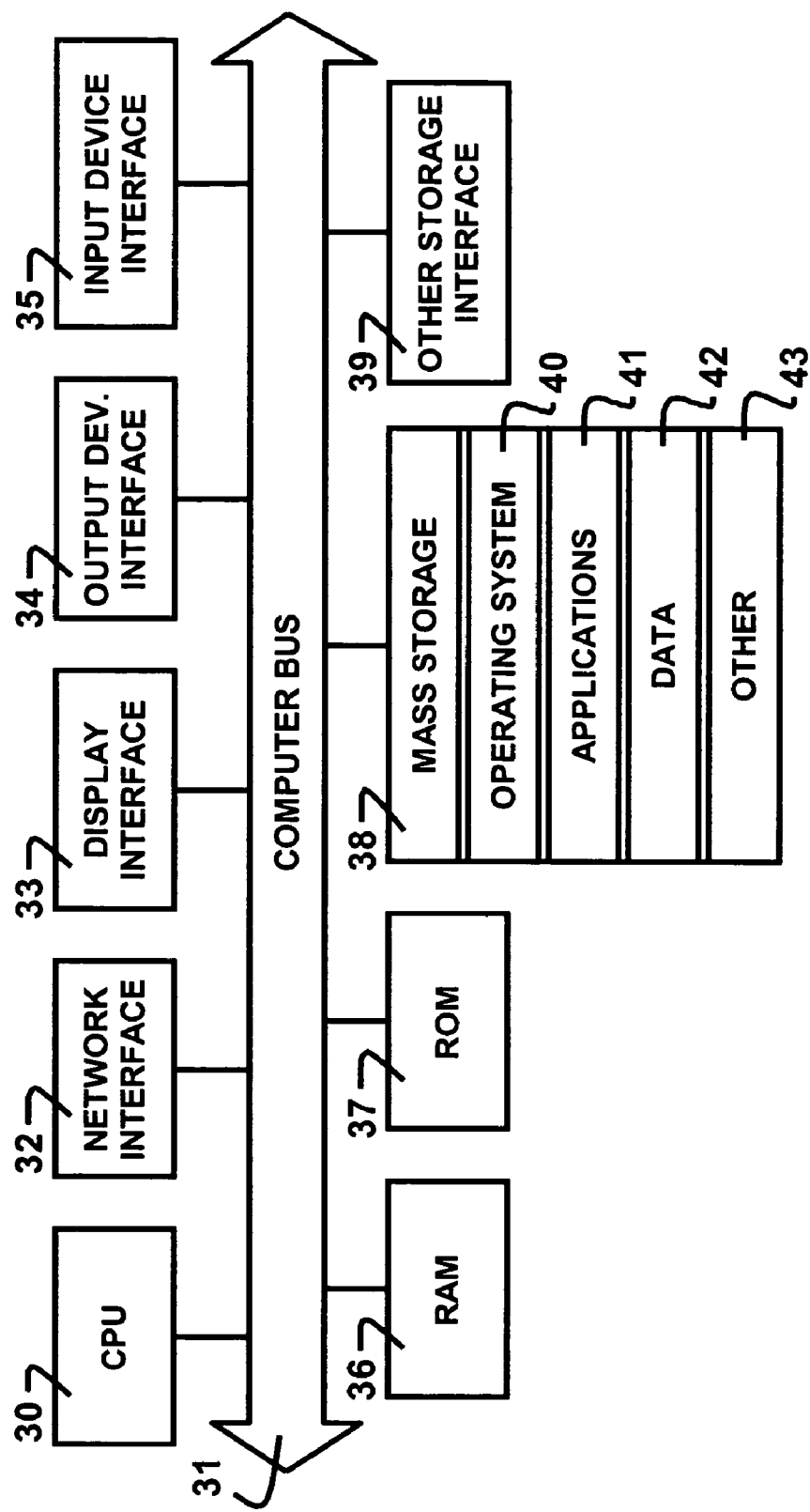
FIG. 4 is a block diagram of a computer system that can be used in the invention.

FIG. 4 is a block diagram of a computer system that can be used as a client, edgebox, collaboration manager, server, or any other computer or system in the invention. The invention is not limited to the computer shown in FIG. 4—any other types of computers and systems can be used for the invention.

The computer system preferably includes central processing unit (CPU) 30 interfaced to bus 31. Also preferably interfaced to bus 31 are network interface 32 for communicating over a network such as the Internet or an intranet, display interface 33 for connecting to a display (not shown), output device interface 34 for connecting to an output device such as a printer (not shown), input device interface 35 for connecting to input devices such as a keyboard and mouse (not shown), random access memory (RAM) 36, read-only memory (ROM) 37, mass storage 38 such as a hard disk or optical drive, and other storage interface 39 to other storage such as a floppy disk, tape drive, or the like. Other elements and interfaces may be included in the computer system. The invention also can be implemented using a computer system that does not include some of the elements shown in FIG. 4.

RAM 36 provides CPU 30 with memory storage. In particular, when executing stored instructions such as those associated with the invention, CPU 30 loads those instructions into RAM 36 from mass storage 38, from some other storage, from a network through network interface 32, or from some other source. The instructions are then executed by CPU 30. RAM 36 also provides storage for use by CPU 30 during the execution of the instructions.

ROM 37 is provided for storing invariant instructions such as start-up instructions for basic input/output system (BIOS) sequences for operation of input and output devices of the computer system.

As mentioned above, mass storage 38 can store instructions for execution by CPU 30. These instructions preferably include code for operating system 40 and for applications 41.

Examples of a suitable operating system include, but are not limited to, Microsoft® Windows, the Apple® Macintosh® operating system, LINUX®, code to implement a Java® virtual machine, and Solaris® (by Sun Microsystems®).

Depending on the use of the computer in FIG. 4, applications 41 can include a browser, a file transfer gateway with one or more services, a file transfer server with one or more adapters, or any other software that can be used to implement the invention. Mass storage 38 preferably stores data 42 for use by this software, as well as other information. Other applications and data 43 also can be present.

Methods of Operation

FIG. 5 to 9 show process flow diagrams of methods including operations of systems including elements for performing large file transfers from behind secure firewalls, such as for example in client-server or B2B design communication environments. The processes shown in FIGS. 5 to 9 encompass the interactions between system elements discussed above with respect to FIGS. 1 to 3, only with different emphasis and/or perspectives. However, these methods are not limited to implementation using the elements shown in FIGS. 1 to 3.

Preferably, the steps in FIGS. 5 to 9 are executed in the order shown. However, the invention also encompasses embodiments in which the steps are executed in different orders, where possible, and in different arrangements, for example in parallel.

Figure 5:
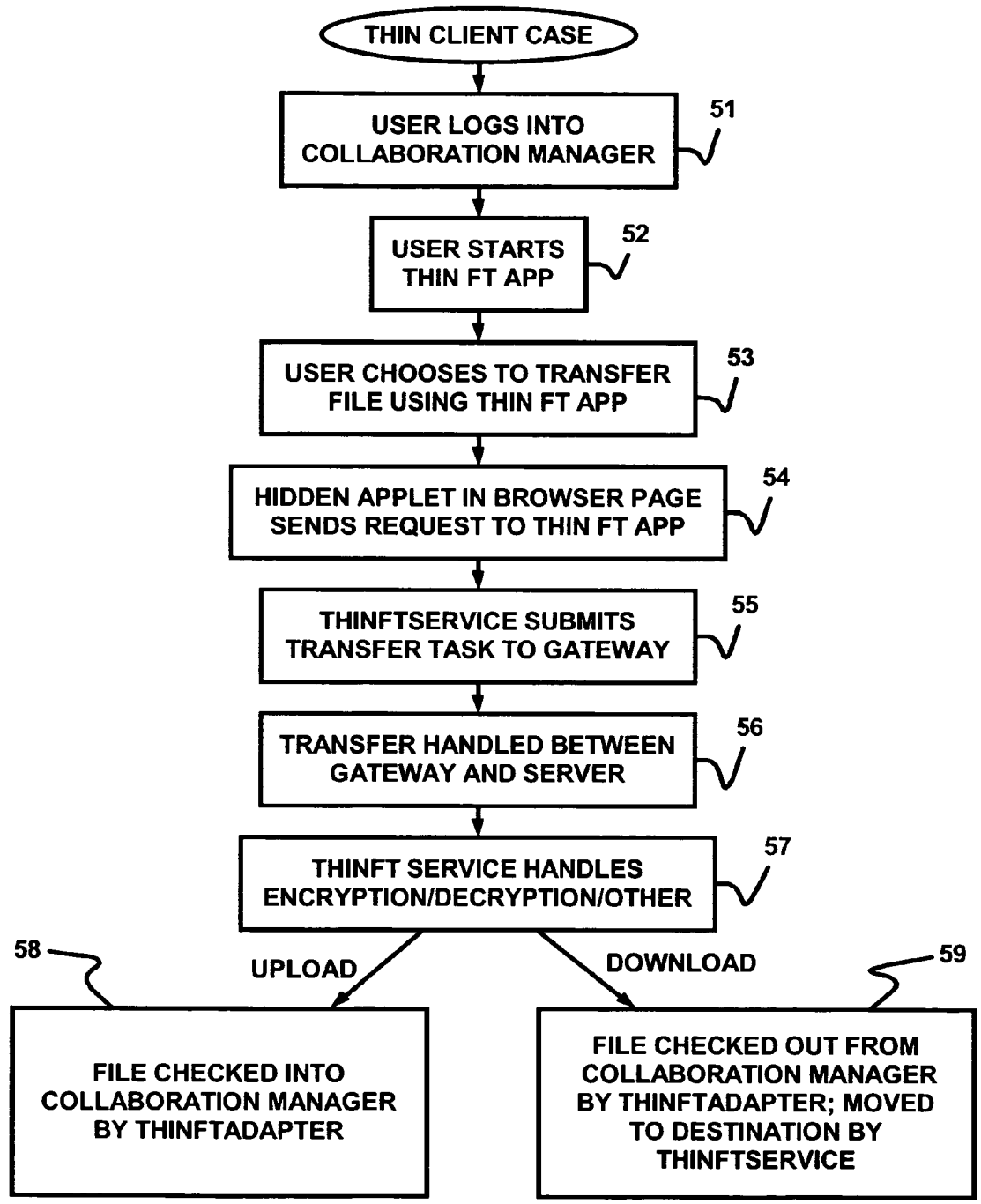
FIG. 5 to 9 show process flow diagrams of methods including operations of systems including elements for performing large file transfers from behind secure firewalls, such as for example in client-server or B2B communication and integration environments.

FIG. 5 shows a process flow diagram for a user-initiated file transfer using a thin client.

In step 51, a user logs into a collaboration manager, which may or may not be behind a firewall. The collaboration manager preferably authenticates the user at log-in. Preferably, the log-in occurs through a web page at the collaboration manager that the user accesses through a browser.

The web page preferably includes a hidden applet that is sent to the user's browser. This applet preferably is signed by the collaboration manager for later security verification. Other security measures can be used instead of or in conjunction with signing the applet.

The user starts up a thin file transfer application such as a gateway and appropriate service in step 52. This step can be performed manually or automatically and can be performed at any time before the transfer.

In step 53, the user chooses to transfer a file using the application. This can occur, for example, when the user selects a file transfer link or icon on the web page.

In step 54, the applet in the web page sends a request for the file transfer to a service provided by the file transfer application. This service then submits the file transfer request to the application itself in step 55.

In step 56, the application makes an out-of-band connection to a file transfer server in accordance with the file transfer request. Verification of authorization to perform the transfer can be checked, for example by verifying the signature on the applet. If verification is successful (or is omitted), the application and server establish a virtual channel and the file is transferred.

In the preferred embodiment, the file is transferred in chunks using HTTP. If the transfer is interrupted, the transfer can be resumed without re-sending already transferred chunks.

Any other operations can be performed on the file in step 57. As with many of the other steps, this step can be performed at a different time than shown in FIG. 5. For example, if the other operation is encryption for a file transfer, the step would be performed before the file transfer. If the other operation is decryption, it would be performed later.

If the file transfer was an upload from the user's location, the file is checked into the collaboration manager in step 58 by an adapter at the file transfer server. Because the collaboration manager and server are on the same side of any firewall, this operation can be performed using more conventional protocols.

If the file transfer was a download to the user's location, the file is checked out from the collaboration manager in step 59 by an adapter at the file transfer server. The file is then moved by the service at the file transfer application to its destination, for example as specified by the user when requesting the file transfer.

Figure 6:
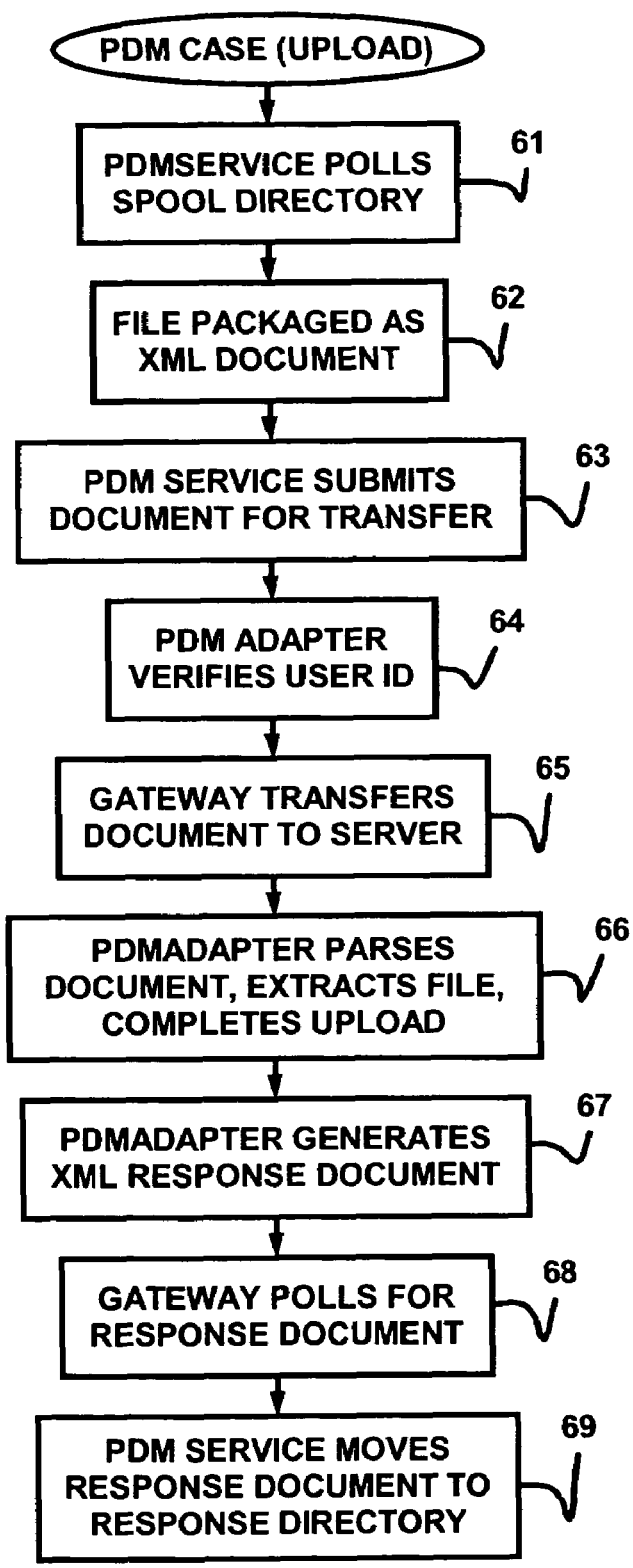

FIG. 6 shows a process flow diagram for an upload of a filed initiated by a PDM or other enterprise system.

In step 61, a service provided by a file transfer application on the system polls a spool directory for a file or files to be uploaded. If a file is present in the directory, it is packaged in step 62, for example as an XML document. Alternatively, no packaging or some other type of packaging can be used.

In step 63, the service submits the document to its file transfer gateway. The gateway accesses a file transfer server, and an adapter at the server verifies the identity of the originating system in step 64. For example, the adapter could verify a user ID for an operator at the system or could verify a system ID.

The gateway makes a connection to the server in step 65, and the gateway and server establish a virtual channel for transferring the file. In the preferred embodiment, the file is transferred in chunks using HTTP. If the transfer is interrupted, the transfer can be resumed without re-sending already transferred chunks.

In step 66, the adapter at the server parses the document, if necessary, and completes the upload of the document to the server.

A response document is generated by the adapter in step 67. The gateway polls for this response document in step 68. This document can be used to verify that the transfer is complete and for other logging and verification purposes. In one embodiment, the service at the gateway moves the response document to a response directory for later examination, as shown in step 69.

Encryption, decryption, application of a hash or digital signature, or other operations can be performed on the file before, during, or after the transfer.

Figure 7:
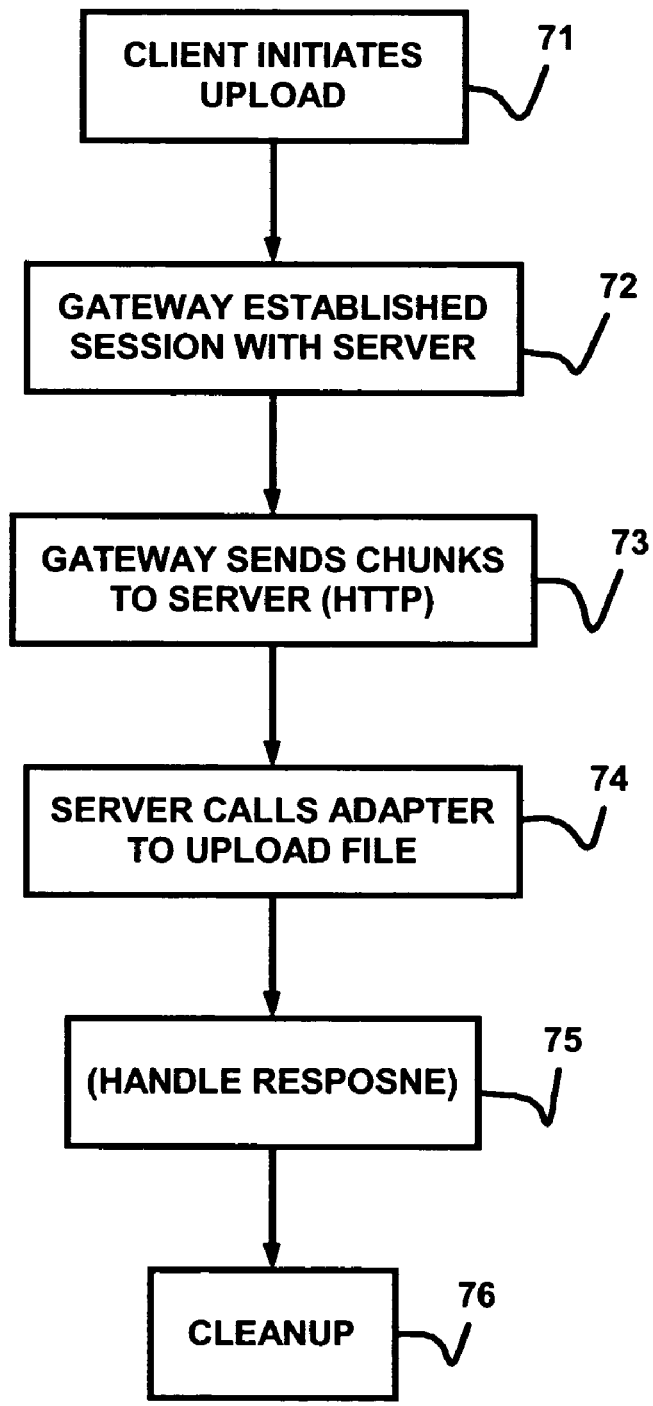

FIG. 7 shows details of a client initiated upload from a more general perspective.

In step 71, a client initiates an upload of a file, for example in response to a user request or command. A gateway at the user's client establishes a session with a file transfer server in step 72. Preferably, a file transfer gateway at the client establishes the session using information retrieved from a collaboration manager.

Once the session is established and any authentication is performed, the gateway sends the file to the server in step 73. Preferably, the file is sent in chunks using HTTP. A different protocol can be used.

The file is actually sent to an adapter at the server, which handles assembling the file from the chunks. The adapter completes the upload of the file in response to a call from the server in step 74.

If any response is needed, the service and the adapter handle the response in step 75. General cleanup is then performed in step 76.

Encryption, decryption, application of a hash or digital signature, or other operations can be performed on the file before, during, or after the transfer.

Figure 8:
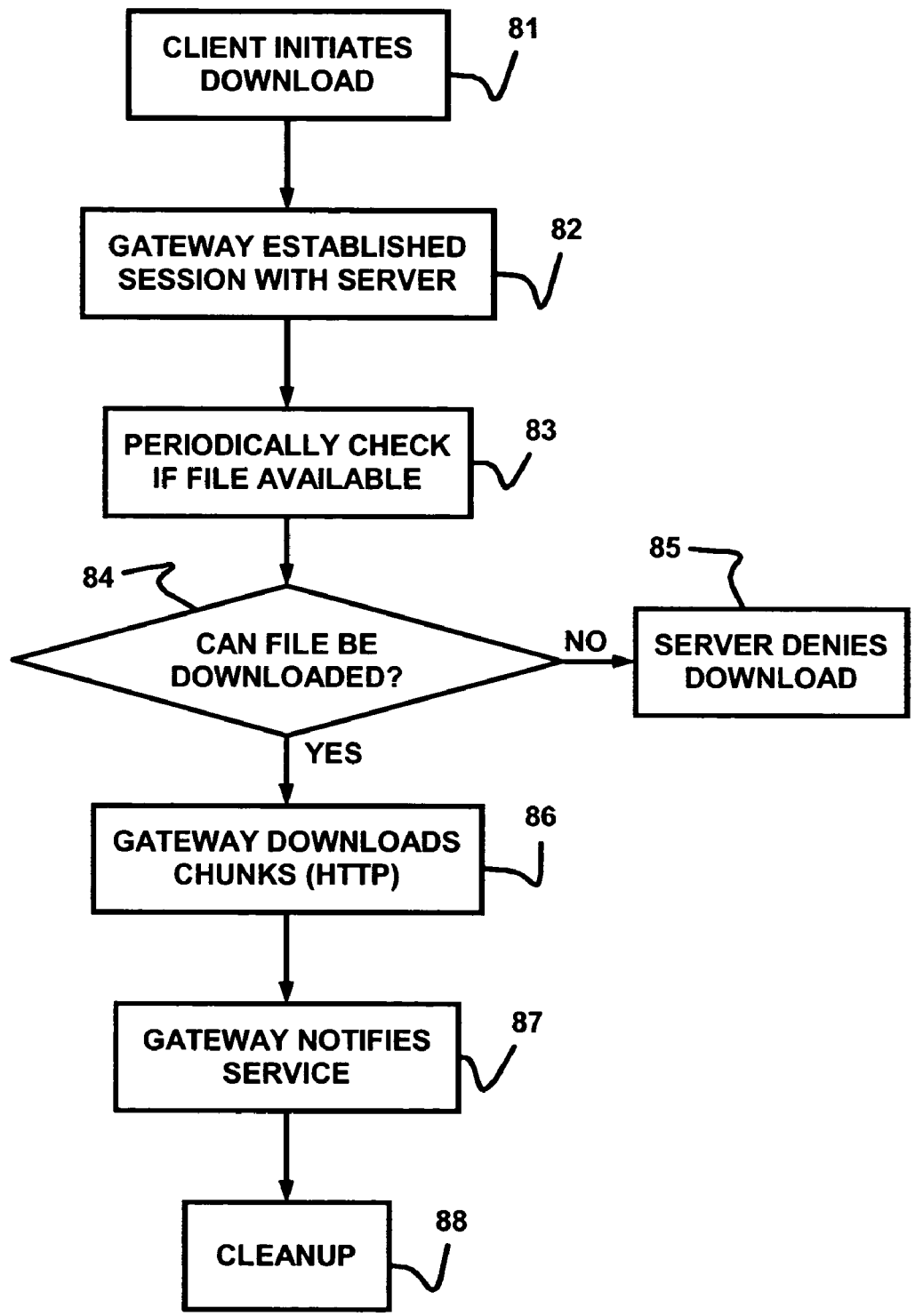

FIG. 8 shows details of a client initiated download from a more general perspective.

In step 81, a client initiates a download of a file, for example in response to a user request or command. A gateway at the user's client establishes a session with a file transfer server in step 82. Preferably, a file transfer gateway at the client establishes the session using information retrieved from a collaboration manager.

Once the session is established and any authentication is performed, the gateway beings to periodically check if the requested file is available for download. This occurs in step 83. Alternatively, a single check or intermittent checks could be made.

The server determines if the file can be downloaded in step 84. If the file cannot be downloaded, the server denies the download in step 85. Otherwise, the file is downloaded from the server to the gateway in step 86. Preferably, the file is downloaded in chunks using HTTP. A different protocol can be used.

The gateway notifies the service that the file has been downloaded in step 87. General cleanup is then performed in step 88.

Encryption, decryption, application of a hash or digital signature, or other operations can be performed on the file before, during, or after the transfer.

Figure 9:
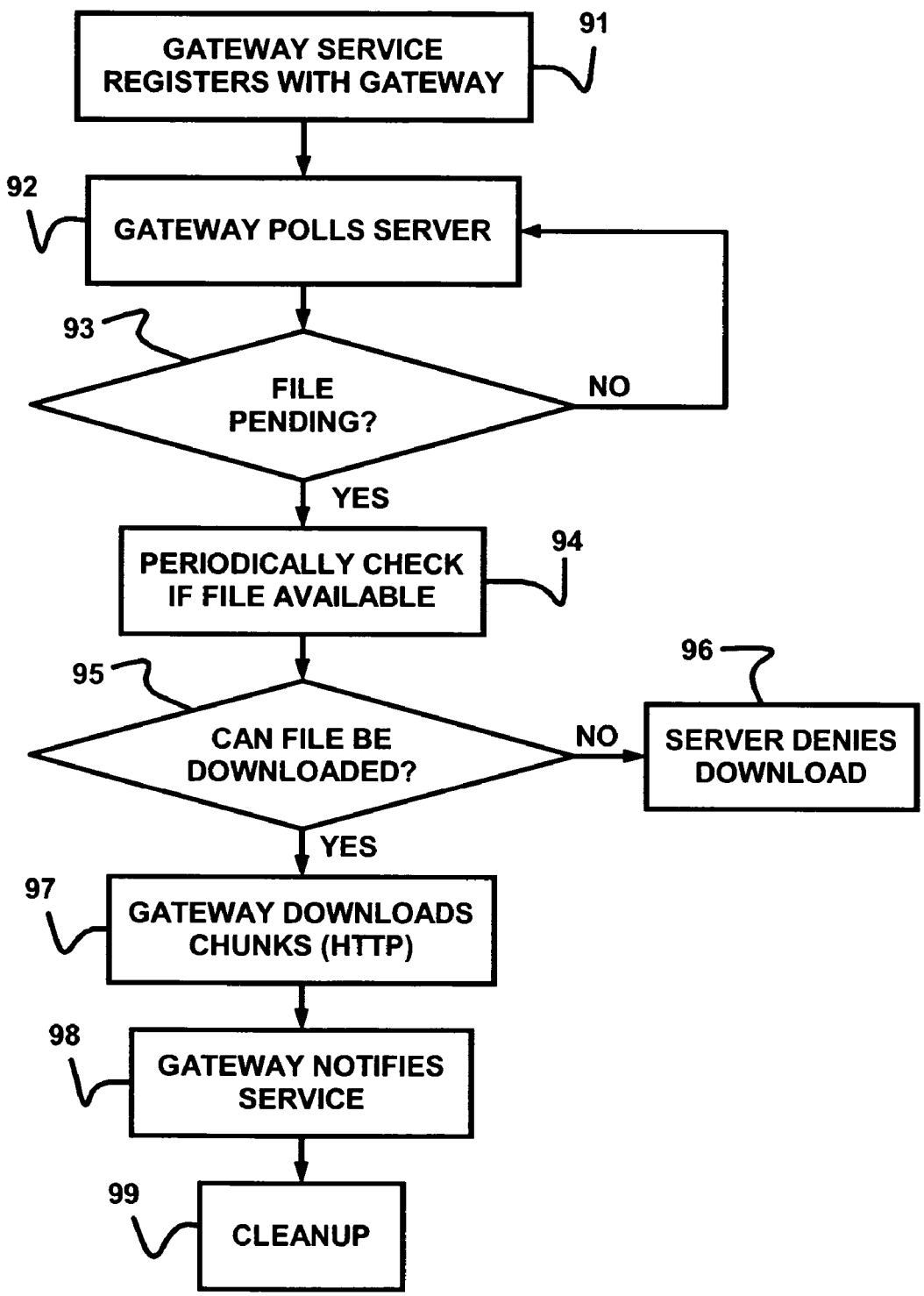

FIG. 9 shows details of a server-initiated download, known as a "push" operation, utilizing a file transfer technique according to one embodiment of the invention.

Briefly, from the target's perspective, one embodiment of this aspect of the invention is a method that includes the steps of registering with the server behind the firewall, polling the server for files to be downloaded, and downloading the file from the server through the firewall over a virtual channel. From the server's perspective, another embodiment is a method that includes receiving a registration at the server behind the firewall, receiving polling of the server for files to be downloaded, and downloading the file from the server through the firewall over a virtual channel.

Returning to FIG. 9, a service for the push operation registers in step 91 with a gateway at a client. The gateway periodically polls the server for files to download. This occurs in steps 92 and 93 until a file is pending.

Once a file is pending, the gateway beings to periodically check if the requested file is available for download. This occurs in step 94. Alternatively, a single check or intermittent checks could be made.

The server determines if the file can be downloaded in step 94. If the file cannot be downloaded, the server denies the download in step 96. Otherwise, the file is downloaded from the server to the gateway in step 97. Preferably, the file is downloaded in chunks using HTTP. A different protocol can be used.

The gateway notifies the service that the file has been downloaded in step 98. General cleanup is then performed in step 99.

Alternative Embodiments

In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

While the various systems and methods are discussed above in an interrelated fashion, each of the systems and methods is not limited to use with the other systems and methods. Furthermore, although preferred embodiments of the invention are disclosed herein, many variations are possible which remain within the content, scope and spirit of the invention, and these variations would become clear to those skilled in the art after perusal of this application.

Technical Appendix

The following information is incorporated into and forms a part of this application. The information provides technical details of one possible implementation of the invention. Other implementations are possible without departing from the scope and spirit of the invention.

What is claimed is:

1. A method of transferring a large file to or from a server past a firewall, said large file exceeding a pre-selected file size limit for transmission past the firewall, comprising the steps of:

accessing a web site behind the firewall, the web site having a web page including an applet, and the web site associated with the server;

receiving the web page and the applet from the web site;

sending the applet to an application at a file transfer gateway; and transferring the large file between the file transfer gateway and the server through the firewall;

wherein the large file is pushed from the server through the firewall to the file transfer gateway by registration of a target with the server behind the firewall, polling the server for files to be downloaded, and downloading the large file from the server through the firewall over a virtual channel and by the server receiving said registration of the target behind the firewall, receiving polling of the server for files to be downloaded, and downloading the large file from the server through the firewall over a virtual channel; and wherein the large file is downloaded from the server through the firewall in chunks.

2. A method as in claim 1, wherein the web site is at a collaboration manager separate from the server.

3. A method as in claim 2, further comprising the step of checking the file out from the collaboration manager to the server.

4. A method as in claim 1, wherein the applet is signed responsive to authorization of a user accessing the web site.

5. A method as in claim 1, wherein accessing the web site and receiving the web page and the applet are performed using a web browser.

6. A method as in claim 5, wherein the web browser and the file transfer gateway are implemented on a client.

7. A method as in claim 1, wherein the application at the file transfer gateway is a file transfer service implemented on a client or edgebox.

8. A method as in claim 7, wherein transferring the large file between the file transfer gateway and the server is performed over a virtual channel between the file transfer service at the file transfer gateway and a file transfer adapter at the server.

9. A method as in claim 1, wherein the chunks are transferred using a basic hypertext transport mechanism.

10. A method as in claim 1, further comprising the step of encrypting, decrypting, or performing some other operation on the large file before or after transferring the large file.

11. A method as in claim 1, further comprising the step of negotiating context information for transferring the file, wherein the server accepts or alters recommended context information sent by the file transfer gateway to the server.

12. A method as in claim 11, wherein the recommended context information comprises quality of service information and recommended file transfer parameters.

13. A method as in claim 1, wherein the large file is in excess of 1 Gigabyte.

14. A method of transferring a large file to or from a server past a firewall, said large file exceeding a pre-selected file size limit for transmission past the firewall, comprising the steps of:
   authenticating access by a requestor to a web site behind the firewall, the web site having a web page including an applet, and the web site associated with the server;
   sending the web page and the applet to the requestor;
   receiving a request from the requestor to transfer the large file to or from the requestor; and
   transferring the large file between the file transfer gateway and the server through the firewall;
   wherein the large file is pushed from the server through the firewall to the file transfer gateway by registration of a target with the server behind the firewall, polling the server for files to be downloaded, and downloading the large file from the server through the firewall over a virtual channel and by the server receiving said registration of the target behind the firewall, receiving polling of the server for files to be downloaded, and downloading the from the server through the firewall over a virtual channel; and wherein the large file is downloaded from the server through the firewall in chunks.

15. A method as in claim 14, wherein the requestor is a browser or edgebox.

16. A method as in claim 14, wherein the applet is signed responsive to authorization of the requester.

17. A method as in claim 14, wherein the web site is at a collaboration manager separate from the server.

18. A method as in claim 17, further comprising the step of checking the file out from the collaboration manager to the server.

19. A method as in claim 14, wherein transferring the large file between the large file transfer gateway and the server is performed over a virtual channel between a file transfer service at the file transfer gateway and a file transfer adapter at the server.

20. A method as in claim 14, wherein the chunks are transferred using a basic hypertext transport mechanism.

21. A method as in claim 14, further comprising the step of encrypting, decrypting, or performing some other operation on the large file before or after transferring the large file.

22. A method as in claim 14, further comprising the step of negotiating context information for transferring the file, wherein the server accepts or alters recommended context information sent by the file transfer gateway to the server.

23. A method as in claim 22, wherein the recommended context information comprises quality of service information and recommended file transfer parameters.

24. A method as in claim 14, wherein the large file is in excess of 1 Gigabyte.

25. A method of downloading a file from a server past a firewall, comprising the steps of:
   registering with the server behind the firewall;
   polling the server for files to be downloaded; and
   downloading the file from the server through the firewall over a virtual channel;
   wherein the file is transferred in chunks using a basic hypertext transport mechanism; and
   wherein the file is pushed from the server through the firewall by said registering step resulting in registration of a target with the server behind the firewall, polling the server for files to be downloaded, and downloading the file from the server through the firewall over a virtual channel and by the server receiving said registration of the target behind the firewall, receiving polling of the server for files to be downloaded, and downloading the file from the server through the firewall over a virtual channel.

26. A method as in claim 25, further comprising the step of encrypting, decrypting, or performing some other operation on the file before or after transferring the file.

27. A method as in claim 25 further comprising the step of negotiating context information for transferring the file, wherein the server accepts or alters recommended context information sent by the target to the server.

28. A method as in claim 27, wherein the recommended context information comprises quality of service information and recommended file transfer parameters.

29. A method of downloading a file from a server past a firewall, comprising the steps of:
   receiving a registration at the server behind the firewall;
   receiving polling of the server for files to be downloaded; and
   downloading the file from the server through the firewall over a virtual channel;
   wherein the file is transferred in chunks using a basic hypertext transport mechanism;
   wherein the file is pushed from the server through the firewall by the step of receiving said registration, comprising the registration of a target with the server behind the firewall, polling the server for files to be downloaded, and downloading the file from the server through the firewall over a virtual channel and by the server receiving said registration of the target behind the firewall, receiving polling of the server for files to be downloaded, and downloading the file from the server through the firewall over a virtual channel.

30. A method as in claim 29, further comprising the step of encrypting, decrypting, or performing some other operation on the file before or after transferring the file.

31. A method as in claim 29, further comprising the step of negotiating context information for transferring the file, wherein the server accepts or alters recommended context information sent by the target to the server.

32. A method as in claim 31, wherein the recommended context information comprises quality of service information and recommended file transfer parameters.

* * * * *